United States Patent [19]

Tsuchida et al.

[11] Patent Number: 4,983,720
[45] Date of Patent: Jan. 8, 1991

[54] PROCESS FOR PREPARING A POLYARYLENE THIOETHER

[75] Inventors: Eishun Tsuchida, Seki; Hiroyuki Nishide, Tokyo; Kimihisa Yamamoto, Hon; Shu Yoshida, Narashino, Japan

[73] Assignee: Idemitsu Petrochemical Co., Ltd., Tokyo, Japan

[21] Appl. No.: 409,351

[22] Filed: Sep. 19, 1989

Related U.S. Application Data

[62] Division of Ser. No. 160,936, Feb. 26, 1988, Pat. No. 4,931,542.

[30] Foreign Application Priority Data

Feb. 28, 1987 [JP] Japan ................... 62-46075
Feb. 28, 1987 [JP] Japan ................... 62-46076
Mar. 28, 1987 [JP] Japan ................... 62-75254

[51] Int. Cl.$^5$ .............................. C08G 75/02
[52] U.S. Cl. .................... 528/373; 528/374; 528/375
[58] Field of Search ............ 528/373, 374, 375

[56] References Cited

U.S. PATENT DOCUMENTS

| | | | |
|---|---|---|---|
| 3,274,165 | 9/1966 | Lenz et al. | 528/374 |
| 3,940,375 | 2/1976 | O'Shaughnessy | 528/373 |
| 3,941,748 | 3/1976 | King | 528/374 |
| 4,544,735 | 10/1985 | Geibel et al. | 528/374 |

FOREIGN PATENT DOCUMENTS

| | | |
|---|---|---|
| 0084896 | 8/1983 | European Pat. Off. |
| 185625 | 10/1983 | Japan |
| 59-207931 | 11/1984 | Japan |
| 61-26799 | 2/1986 | Japan |
| 509619 | 8/1977 | U.S.S.R. |
| 698988 | 11/1979 | U.S.S.R. |

OTHER PUBLICATIONS

Chemical Abstracts, vol. 101, No. 26, Dec. 24, 1984, p. 14, 231233y.
WPIL, File Supplier, 1985, ref. No. 009435.
WPIL, File Supplier, 1986, ref. No. 078356.
Macromolecules, vol. 20, No. 9, Sep. 1987, pp. 2315-2316; Am. Chem. Soc., U.S.
Marcomolecules, vol. 20, No. 8, Aug. 1987, pp. 2030-2031; Am. Chem. Soc., U.S.
Polymer Bulletin, vol. 15, No. 2, Feb. 1986, pp. 141-145, Springer-Verlag, Berlin DE M. Wejchan-Judek: "The Synthesis of Poly-/p-Phenylene Sulphide/from Thiophenol in the Presence of Various Acidic Catalysts".

Primary Examiner—Lewis T. Jacobs
Assistant Examiner—David W. Woodward
Attorney, Agent, or Firm—Armstrong, Nikaido, Marmelstein, Kubovcik & Murray

[57] ABSTRACT

A process for preparing polyarylene thioethers wherein thiophenols of formula

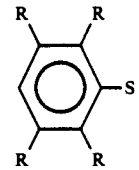

or

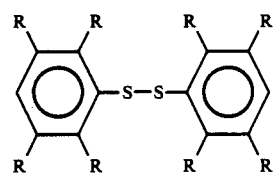

are electrolytically polymerized in the presence of a Lewis acid and/or a proton acid.

4 Claims, No Drawings

PROCESS FOR PREPARING A POLYARYLENE THIOETHER

This is a division of application Ser. No. 160,936 filed Feb. 26, 1988, now U.S. Pat. No. 4,931,542.

BACKGROUND OF THE INVENTION

1. Field of the Invention

This invention relates to a process for preparing a polyarylene thioether, more particularly to a process for preparing a polyarylene thioether with good efficiency under mild polymerization conditions.

2. Descriptions of Prior Art

The polyarylene thioether (hereinafter often referred to as PAT) such as polyphenylene thioether (hereinafter often referred as PPT) has hitherto been prepared by condensation polymerization of an aromatic dihalide and an alkali metal sulfide in a polar solvent at a high temperature under pressure.

However, this method has such problems that (1) an alkali metal salt remains in PAT and deteriorates the electrical properties of PAT and (2) a great amount of energy is consumed at a high cost.

On the other hand, a process for preparing PAT by the polymerization of a thiophenol is known from USSR Patent No. 698,988. This process is industrially unadvantageous, because this process requires the use of a highly expensive catalyst such as $MoCl_5/CF_3COOH$. Furthermore, another process using sulfuric acid as a catalyst is known but this process has such a defect that a great amount of by-products, particularly cross-linked polymers is produced.

SUMMARY OF THE INVENTION

The object of the invention is to provide a process for preparing a polyarylene thioether such as substantially straight-chain polyphenylene thioether having excellent electrical, mechanical and chemical properties, particularly containing a less amount of the by-products, cross-linked polymers, under mild polymerization conditions, without the above-mentioned problems and defects, with ease and at a low cost, that is, with industrial advantages.

The present inventors have now found that the above-mentioned object of this invention can effectively be attained by polymerizing thiophenols and/or diphenyldisulfides as starting monomers in the presence of a specific catalyst.

In accordance with one process of this invention, the polyarylene thioether is prepared by polymerizing thiophenols represented by the formula (I) of

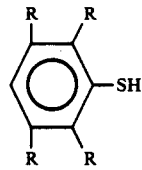
(I)

wherein each of four groups R is a substituent selected from the group consisting of hydrogen atom, a lower alkyl group, halogen atom and lower alkoxy group, and the four groups R may be different from or identical with each other, in the presence of an oxidizing agent and a Lewis acid as a catalyst.

In accordance with another process of this invention, the polyarylene thioether is prepared by polymerizing diphenyldisulfides represented by the formula (II) of

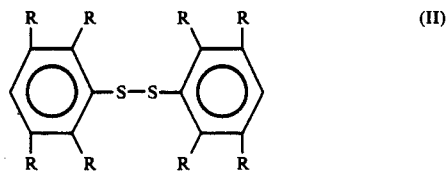
(II)

wherein S is sulfur atom and each of four gorups R is a substituent selected from the group consisting of hydrogen atom, a lower alkyl group, halogen atom and lower alkoxy group, the groups R may be different from or identical with each other, in the presence of a Lewis acid as a catalyst.

In accordance with a still further process of this invention, the polyarylene thioether is prepared by polymerizing the thiophenols having the formula (I) and/or the diphenyldisulfide having the formula (II) in the presence of a Lewis acid and/or a proton acid.

DETAILED DESCRIPTIONS OF PREFERRED EMBODIMENTS

Thiophenols

Detailed explanation will be made below on the four groups R in the above-mentioned formula (I):

As examples of the groups R there are hydrogen atom, a lower alkyl group such as methyl group, ethyl group, propyl group, 1-methylethyl group, butyl group, 1-methylpropyl group, 2-methylpropyl group, 1,1-dimethylthyl group, pentyl group, hexyl group, heptyl group and octyl group; a halogen atom such as fluorine atom, chlorine atom, bromine atom and iodine atom; and a lower alkoxy group such as methoxy group, ethoxy group, propoxy group, isopropoxy group, butoxy group, isobutoxy group, sec-butoxy group, tert-butoxy group, pentyloxy group and hexyloxy group.

Among these examples are preferred hydrogen atom; a further lower alkyl group such as methyl group or ethyl group; fluorine atom or chlorine atom; and a further lower alkoxy group such as methoxy group, particularly preferred hydrogen atom, methyl group, ethyl group or chlorine atom.

As examples of the thiophenols represented by the formula (I) are preferred thiophenol, 2-methylthiophenol, 2-ethyl-thiophenol, 2-propylthiophenol, 2-(1-methylethyl)thiophenol, 2-butylthiophenol, 2-(1-methylpropyl)thiophenol, 2-(2-methylbutyl)thiophenol, 2-(1,1-dimethylethyl)thiophenol, 2-pentylthiophenol, 2-hexylthiophenol, 2-octylthiophenol, 2-fluorothiophenol, 2-chlorothiophenol, 2-bromothiophenol, 2-iodothiophenol, 2-methoxythiophenol, 2-ethoxythiophenol, 2-propoxythiophenol, 2-isopropoxythiophenol, 2-butoxythiophenol, 2-sec-butoxythiophenol, 2-isobutoxythiophenol, 2-tert-butoxythiophenol, 2-pentyloxythiophenol, 2-hexyloxythiophenol, 2,6-dimethylthiophenol, 2,6-diethylthiophenol, 2-methyl-6-ethylthiophenol, 2,6-difluorothiophenol, 2-methyl-6-fluorothiophenol, 2-ethyl-6-fluorothiophenol, 2,6-dichlorothiophenol, 2,6-dibromothiophenol, 2-methyl-6-chlorothiophenol, 2,6-dimethoxythiophenol, 2-methyl-6-methoxythiophenol, 2,3-dimethylthiophenol, 2,3-diethylthiophenol, 2,3-difluorothiophenol, 2-methyl-3-fluorothiophenol, 2-fluoro-3-methylthiophenol, 2,3-dimethoxythiophenol, 2-methyl-3-methoxythiophenol, 2,3-dichlorothiophenol, 2-methyl-3-chlorothiophenol, 3-chloro-2-methylthiophenol, 2,5-dimethylthiophenol, 2,5-difluorothiophenol, 2,5-diethylthiophenol, 2-methyl-5-fluorothiophenol, 2-methyl-5-ethylthiophenol, 2-fluoro-5-methylthiophenol, 2,5-dichlorothiophenol, 2,5-dimethoxythiophenol, 2-methyl-5-chlorothiophenol, 2-methyl-5-methoxythiophenol, 2-chloro-5-methylthiophenol, 2-methoxy-5-methylthiophenol, 2-chloro-5-fluorothiophenol, 2-ethyl-5-chlorothiophenol, 2-chloro-5-ethylthiophenol, 3,5-dimethylthiophenol, 3,5-difluorothiophenol, 3,5-dimethoxythiophenol, 3,5-diethylthiophenol, 3,5-dichlorothiophenol, 3-methyl-5-fluorothiophenol, 3-methyl-5-chlorothiophenol, 3-methyl-5-methoxythiophenol, 2,3,5-trimethylthiophenol, 2,3,5-trifluorothiophenol, 2,3,5-triethylthiophenol, 2,3,5-trichlorothiophenol, 2-methyl-3,5-difluorothiophenol, 2,3,5,6-tetramethylthiophenol, 2,3,5,6-tetrafluorothiophenol, 2,3,5,6-tetrachlorthiophenol, 2,3,5,6-tetramethoxythiophenol, 2,3,5,6-tetraethylthiophenol, 2,6-dimethyl-3,5-tetrafluorothiophenol, 2,6-diethyl-3,5-difluorothiophenol, 2,6-diethyl-3,5-dichlorothiophenol, 2,6-diethyl-3,5-dimethylthiophenol, 2,6-diethyl-3,5-dimethoxythiophenol, 2,6-dimethyl-3,5-dichlorothiophenol and 2-methyl-6-ethyl-3,5-difluorothiophenol.

Among these examples are particularly preferred thiophenol, 2-methylthiophenol, 2-ethylthiophenol, 2-fluorothiophenol, 2-chlorothiophenol, 2-methoxythiophenol, 2,6-dimethylthiophenol, 2,6-diethylthiophenol, 2,6-difluorothiophenol, 2,6-dichlorothiophenol, 2,6-dimethoxythiophenol, 2,3,5,6-tetrachlorothiophenol and 2,3,5,6-tetramethylthiophenol:

These thiophenols may be used singly or in combination of two or more thereof.

Diphenyl Disulfide

Detailed explanation will be made below on the group R in the above-mentioned formula (II):

As examples of the groups R there are hydrogen atom; a lower alkyl group such as methyl group, ethyl group, propyl group, 1-methylethyl gorup, butyl group, 1-methylpropyl gorup, 2-methylpropyl group, 1,1-dimethylethyl group, pentyl group, hexyl group, heptyl group and octyl gorup; a halogen atom such as fluorine atom, chlorine atom, bromine atom and iodine atom; a lower alkoxy group such as methoxy group, ethoxy group, propoxy group, isopropoxy group, butoxy group, isobutoxy group, sec-butoxy group, tert-butoxy group, pentyloxy group and hexyloxy gorup. Among these groups are preferred hydrogen atom; a further lower alkyl group such as methyl group and ethyl group; a halogen atom such as fluorine atom and chlorine atom; and a further lower alkoxy group such as methoxy group, particularly hydrogen atom, methyl group, ethyl group and chlorine atom.

As examples of the diphenyl disulfides represented by the formula (II) there are symmetrical diphenyl disulfides such as diphenyl disulfide, 2,2'-dimethyldiphenyl disulfide, 3,3'-diphenyldimethyl disulfide, 2,2',6,6'-tetramethyldiphenyl disulfide, 2,2',3,3'-tetramethyldiphenyl disulfide, 2,2',5,5'-tetramethyldiphenyl disulfide, 3,3',5,5'-tetramethyldiphenyl disulfide, 2,2',3,3',6,6'-hexamethyldiphenyl disulfide, 2,2',3,3',5,5'-hexamethyldiphenyl disulfide, 2,2',3,3',5,5',6,6'-octamethyldiphenyl disulfide, 2,2'-diethyldiphenyl disulfide, 3,3'-diethyldiphenyl disulfide, 2,2',6,6'-tetraethyldiphenyl disulfide, 2,2',3,3',6'6-hexaethyldiphenyl disulfide, 2,2',3,3',5,5',6,6'-octaethyldiphenyl disulfide, 2,2'-dipropyldiphenyl disulfide, 3,3'-dipropyldiphenyl disulfide, 2,2',5,5'-tetrapropyldiphenyl disulfide, 2,2'-(1-methylethyl)diphenyl disulfide, 2,2'-dibutyldiphenyl disulfide, 2,2-dipentyldiphenyl disulfide, 2,2'-dihexyldiphenyl disulfide, 2,2'-difluorodiphenyl disulfide, 2,2'-dichlorodiphenyl disulfide, 2,2'-dibromodiphenyl disulfide, 2,2'-diiododiphenyl disulfide, 3,3'-difluorodiphenyl disulfide, 3,3'-dichlorodiphenyl disulfide, 3,3'-dibromodiphenyl disulfide, 3,3'-diiododiphenyl disulfide, 2,2',3,3'-tetrafluorodiphenyl disulfide, 2,2',3,3'-tetrachlorodiphenyl disulfide, 2,2',5,5'-tetrafluorodiphenyl disulfide, 2,2',5,5'-tetrachlorodiphenyl disulfide, 2,2',6,6'-tetrafluorodiphenyl disulfide, 2,2',6,6'-dichlorodiphenyl disulfide, 2,2',6,6'-tetrabromodipheyl disulfide, 3,3',5,5'-tetrafluorodiphenyl disulfide, 3,3',5,5'-tetrachlorodiphenyl disulfide, 2,2',3,3',5,5'-hexafluorodiphenyl disulfide, 2,2',3,3',5,5'-hexachlorodiphenyl disulfide, 2,2',3,3',6,6'-hexafluorodiphenyl disulfide, 2,2',3,3',6,6'-hexachlorodiphenyl disulfide, 2,2',3,3',5,5',6,6'-octafluorodiphenyl disulfide, 2,2',3,3',5,5',6,6'-octachlorodiphenyl disulfide, 2,2'-dimethoxydiphenyl disulfide, 2,2'-diethoxydiphenyl disulfide, 2,2'-diisopropoxydiphenyl disulfide, 2,2'-dipropoxydiphenyl disulfide, 2,2'-dibutoxydiphenyl disulfide, 2,2',3,3'-tetramethoxydiphenyl disulfide, 2,2',6,6'-tetramethoxydiphenyl disulfide, 2,2',6,6'-tetraethoxydiphenyl disulfide, 3,3'-dimethoxydiphenyl disulfide, 2,2',5,5'-tetramethoxydiphenyl disulfide, 2,2'-dimethyl-3,3'-diethyldiphenyl disulfide, 2,2'-dimethyl-6,6'-diethyldiphenyl disulfide, 2,2'-dimethyl-6,6'-difluorodiphenyl disulfide, 2,2'-dimethyl-6,6'-dichlorodiphenyl disulfide, 2,2',6,6'-tetramethyl-3,3',5,5'-tetrafluorodiphenyl disulfide, 2,2'-difluoro-6,6'-dichlorodiphenyl disulfide, 2,2'-difluoro-6,6'-dimethoxydiphenyl disulfide, 2,2'-difluoro-3,3'-dichlorodiphenyl disulfide, 2,2'-difluoro-3,3'-dichlorodiphenyl disulfide, 2,2'-difluoro-6,6'-diethyldiphenyl disulfide, 2,2',6,6'-tetrafluoro-3,3',5,5'-tetrametyldiphenyl disulfide, 2,2',6,6'-tetramethyl-3,3',5,5'-tetrachlorodiphenyl disulfide, 2,2',6,6'-tetraethyl-3,3',4,4'-tetramethyldiphenyl disulfide and 2,2',6,6'-tetraethyl-3,3',5,5'-tetrafluorodiphenyl disulfide; and unsymetrical diphenyl disulfides such as 2-methyldiphenyl disulfide, 2-ethyldiphenyl disulfide, 2-propyldiphenyl disulfide, 2-butyldiphenyl disulfide, 2-fluorodiphenyl disulfide, 2-chlorodiphenyl diulfide, 2-methoxydiphenyl disulfide, 2,6-dimethyldiphenyl disulfide, 2,6-diethyldiphenyl disulfide, 2,6-difluorodiphenyl disulfide, 2,3-dimethyldiphenyl disulfide, 2,3,5,6-tetrafluorodiphenyl disulfide, 2,3,5,6-tetramethyldiphenyl disulfide, 2,3,6-trimethyldiphenyl disulfide, 2,6-dimethyl-2'-methyldiphenyl disulfide, 2,6-dimethyl-2'-ethyldiphenyl disulfide, 2,6-dimethyl-2',3',5',6'-tetrafluorodiphenyl disulfide, 2,6-dimethyl-2'-methoxydiphenyl disulfide, 2,6-diethyl-2'-methyldiphenyl disulfide, 2,6-diethyl-2'-ethyldiphenyl disulfide, 2,6-diethyl-2,3,5,6-tetrafluorodiphenyl disulfide, 2,6-dimethyl-2',6'-diethyldiphenyl disulfide, 2,6-dimethyl-2',6'-difluorodiphenyl disulfide and 2,3,5,6-tetramethyl-2',3',5',6'-tetrafluorodiphenyl disulfide.

These diphenyl disulfides may be used singly or in combination of two or more thereof.

Oxidizing Agents

The oxidizing agents used herein are not particularly limited if they are capable of oxidizing the thiophenols and producing the diphenyl disulfides and do not substantially deactivate the catalytic activity of the Lewis acids used in this invention.

As examples of the oxidizing agents there are an oxidizing gas such as oxygen gas, ozone or chlorine, or a such gas-containing oxidizing composition such as air; an oxidizing oxide, oxidizing composite oxide, oxidizing oxoacid and oxidizing oxoate such as copper(II) oxide, silver(II) oxide, iron(III) oxide, cobalt(III) oxide, nickel(II) oxide, manganese(IV) oxide, ruthenium(III) oxide, rhodium(III) oxide, platinum(II) oxide, platinum(IV) oxide, palladium(II) oxide, rhenium(IV) oxide, chromium(VI) oxide, molybdenum(VI) oxide, vanadium(V) oxide, thallium(III) oxide, tin (IV) oxide, lead(IV) oxide, sulfur(IV) oxide, sulfur(VI) oxide, tellurium(IV) oxide, arsenic(V) oxide, bismuth(III) oxide, bismuth(V) oxide, heteropolyacids, perovskite, potassium permanganate, perrhenic acid, sodium dichromate, sulfuric acid, chloric acid, sodium chlorate, hypochlorous acid and sodium hypochlorite; an oxidizing metal chloride or oxidizing metal oxychloride such as antimony chloride, copper(II) chloride, iron (III) chloride, cobalt(II) chloride, tin(IV) chloride, tellurium(IV) chloride, lead(IV) chloride, palladium(II) chloride, ruthenium(III) chloride, platinum(II) chloride, platinum(IV) chloride, silver(I) chloride, chromium dioxide dichloride and molybdenum oxychloride; and an oxidizing element such as iodine and bromine.

Among these oxidizing agents there are preferred, for example, copper(II) oxide, iodine, oxygen gas, air, antimony pentachloride or sulfuric acid, particularly iodine, antimony pentachloride, oxygen or air.

These oxidizing agents may be used singly or in combination of two or more thereof.

Furthermore, one of these oxidizing agents which can function as the under-mentioned Lewis acid can be used for both the oxidizing agent and the Lewis acid catalyst. Examples of such agents are metals halides such as antimony pentachloride and ferric oxide.

One of these oxidizing agents which are usable as a solvent for the polymerization can be used for both the oxidizing agent and the solvent. Such agents are, for example, sulfuric acid.

Lewis Acids

As the above-mentioned Lewis acids used in this invention there are well-known, so-called "Lewis acids" (referred formally to as non-proton acids) such as a metal halide and oxyhalide, an oxoacid salt such as a sulfate, nitrate, phosphate, bromate, silicate, metallosilicate and heteroacid salt, a fluorosilicate and an acidic oxide, or a Lewis acid composition containing the above-mentioned Lewis acid. Among these acids there may generally be used ones which are capable of functioning as a catalyst for cationic polymerization.

These Lewis acids or Lewis acid compositions are formally classified as a non-proton acid, but it is known that part of these Lewis acids are converted to a proton acid in the presence of a proton donor such as water of crystallization, constitution water or adsorption water. Furthermore, when these non-proton type Lewis acids are used as a supporting electrolyte in electrolytic polymerization or a usual acid catalyst in the reaction, it has been indicated that there is a possibility of a proton to pertain to function of the acid catalyst and electric conduction.

Thus, in this invention, the above-mentioned Lewis acid or Lewis acid composition may be used even in the presence of such an amount of water or a proton donor that the polymerization activity of this acid is not substantially eliminated.

Furthermore, if the above-mentioned various metal salts are in a hydrated form, then they may be subjected to activation such as heat treatment, as desired, to be converted to the Lewis acid, which can be used in the present invention.

The metal salts which can preferably be used as the converted Lewis acid in the present invention include a halide, oxyhalide or halogen complex of at least one element selected from Group IIa to VIa, Group VIII and IIb to VIb of the Periodic Table. Particularly the halide is preferred.

Examples of the halide are various halides such as a beryllium halide such as $BeF_2$, $BeCl_2$ and $BeBr_2$, a magnesium halide such as $MgF_2$, $MgCl_2$ and $MgBr_2$, a lanthanum halide such as $LaF_3$ and $LaCl_3$, a cerium halide such as $CeF_3$, $CeCl_3$, $CeF_4$, $CeCl_4$ and $CeBr_3$, a titanium halide such as $TiCl_2$, $TiCl_3$, $TiF_4$, $TiCl_4$, $TiBr_4$, $TiI_4$ and $TiCl_2Br_2$, a zirconium halide such as $ZrF_4$, $ZrCl_4$ and $ZrBr_4$, a hafnium halide such as $HfCl_4$, a vanadium halide such as $VCl_2$, $VCl_3$, $VF_3$, $VCl_4$ and $VBr_4$, a niobium halide such as $NbCl_3$, $NbBr_3$, $NbF_5$, $NbCl_5$ and $NbBr_5$, a tantalum halide such as $TaF_5$, $TaCl_3$, $TaCl_5$, $TaBr_3$ and $TaBr_5$, a chromium halide such as $CrF_3$, $CrCl_2$, $CrCl_3$, $CrBr_2$, $CrBr_3$, $CrI_2$ and $CrI_3$, a molybdenum halide such as $MoF_3$, $MoF_4$, $MoF_5$, $MoF_6$, $MoCl_2$, $MoCl_3$, $MoCl_4$, $MoCl_5$, $MoBr_3$, $MoBr_4$, $MoBr_5$ and $MoI_5$, a tungsten halide such as $WF_4$, $WF_6$, $WCl_2$, $WCl_4$, $WCl_5$, $WCl_6$, $WBr_6$ and $WI_6$, a manganese halide such as $MnF_2$, $MnCl_2$, $MnBr_2$ and $MnI_2$, rhenium halide such as $ReF_6$, $ReCl_3$ and $ReCl_5$, an iron halide such as $FeF_2$, $FeCl_2$, $FeBr_2$, $FeI_2$, $FeCl_3$, $FeBr_3$ and $FeI_3$, a cobalt halide such as $CoF_2$, $CoCl_2$, $CoBr_2$, $CoI_2$, $CoCl_3$, $CoBr_3$ and $CoI_3$, a ruthenium halide such as $RuCl_3$, $RuBr_3$ and $RuI_3$, a nickel halide such as $NiF_2$, $NiCl_2$, $NiBr_2$ and $NiI_2$, a palladium halide such as $PdF_2$, $PdCl_2$, $PdBr_2$ and $PdI_2$, a rhodium halide such as $RhCl_3$, $RhBr_3$ and $RhI_3$, a platinum halide such as $PtF_2$, $PtCl_2$, $PtBr_2$, $PtI_2$, $PtCl_4$ and $PtBr_4$, a copper halide such as $CuCl$, $CuF_2$, $CuCl_2$, $CuBr_2$ and $CuI_2$, a silver halide such as $AgF$, $AgCl$, $AgBr$ and $AgI$, a zinc halide such as $ZnF_2$, $ZnCl_2$, $ZnBr_2$ and $ZnI_2$, a cadmium halide such as $CdF_2$, $CdCl_2$, $CdBr_2$ and $CdI_2$, a mercury halide such as $Hg_2Cl_2$ and $HgCl_2$, a boron halide such as $BF_3$, $BCl_3$, $BBr_3$ and $BI_3$, an aluminum halide such as $AlF_3$, $AlCl_3$, $AlBr_3$ and $AlI_3$, a gallium halide such as $GaF_3$, $GaBr_3$ and $GaI_3$, an indium halide such as $InF_3$, $InCl_3$ and $InBr_3$, a thallium halide such as $TlF_3$, $TlCl_3$, $TlCl$ and $Tl_2Br_4$, a silicon halide such as $SiF_4$ and $SiCl_4$, a germanium halide such as $GeF_4$, $GeCl_4$ and $GeBr_4$, a tin halide such as $SnF_2$, $SnF_4$, $SnCl_2$, $SnCl_4$, $SnBr_2$, $SnBr_4$, $SnI_2$ and $SnI_4$, a lead halide such as $PbF_2$, $PbF_4$, $PbCl_2$, $PbCl_4$, $PbBr_2$ and $PbI_2$, a phosphorus halide such as $PF_5$ and $PCl_5$, an arsenic halide such as $AsF_5$ and $AsCl_5$, an antimony halide such as $SbF_5$, $SbCl_5$ and $SbBr_5$, a bismuth halide such as $BiF_3$ and $BiCl_3$, and a tellurium halide such as $TeCl_2$ or $TeCl_4$; and various oxyhalides such as $ZrOCl_2$, $Ti(OH)Cl_3$, $MoOCl$, $MoO_2Cl_2$, $WOCl_4$, $WO_2Cl_2$, $CrOCl_4$, $CrO_2Cl_2$, $VOCl_3$, $POCl_3$ and $SO_2Cl_2$.

Among these halides are preferred halides of elements selected from beryllium, magnesium, zinc, boron, aluminum, gallium, tin, antimony, bismuth, tellurium, titanium, zirconium, niobium, tantalum, chromium, molybdenum, tungsten, iron, cobalt and copper, particularly preferred aluminum chloride, titanium tetrachloride, antimony pentachloride and tungsten hexachloride.

These compounds may be used in a substantial anhydride form, as a complex having a ligand easily removable in a reaction form such as an ether complex, alcohol complex, carboxylic complex or nitrilic complex, or in such a state that they contain an amount of water or other proton donors substantially not to deteriorate the catalytic activity.

Furthermore, these Lewis acids or Lewis acid compositions may contain or combine with such an amount of an alkali metal compound that the catalytic activity is substantially not damaged.

The above-mentioned Lewis acids may be used singly or in a mixed form or combined form of two or more thereof, for the polymerization in this invention.

Proton Acids

As the above-mentioned proton acids are used well-known organic or inorganic acids, or a mixture or composite thereof. For example, the proton acids are a non-oxoacid such as hydrochloric acid, hydrobromic acid or prussic acid; an inorganic oxoacid such as sulfuric acid, phosphoric acid, chloric acid, bromic acid, nitric acid, carbonic acid, boric acid, molybdic acid, an isopoly-acid or heteropoly-acid; a sulfuric acid partial salt or partial ester such as sodium hydrogen sulfate, sodium dihydrogen phosphate, a proton-containing heteropoly-acid, monomethylsulfuric acid or trifluoromethylsulfuric acid; a compound usable as a proton acid when dissolved in a solvent or decomposed, such as ammonium chloride, ammonium phosphate, ammonium sulfate or ammonium heteropoly-acid; a mono- or polycarboxylic acid such as acetic acid, propionic acid, butanoic acid, succinic acid, benzoic acid or phthalic acid; a halogen-substituted carboxylic acid such as monochloroacetic acid, dichloroacetic acid, trichloroacetic acid, monofluoroacetic acid, difluoroacetic acid or trifluoroacetic acid; a mono- or polysulfonic acid such as methanesulfonic acid, ethanesulfonic acid, propanesulfonic acid, butanesulfonic acid, benzene-sulfonic acid, toluenesulfonic acid, trifluoromethane-sulfonic acid or benzenedisulfonic acid; and a partial metal salt of a polysulfonic acid such as sodium benzenesulfonate. Among these acids are preferred strong proton acids which are liquid or easily soluble in a solvent and non-volatile and highly stable, such as sulfuric acid, phosphoric acid, trifluoroacetic acid, trifluoromethylsulfuric acid, heteropoly-acids and sulfonic acid, particularly preferred sulfuric acid, trifluoroacetic acid or trifluoromethylsulfuric acid.

In the present invention, the above-mentioned proton acids may be used singly or in a mixed form or composite form of two or more thereof. Furthermore, at least one of the above-mentioned Lewis acids and at least one of the above-mentioned proton acids may be used in a mixed form or composite form.

Polymerization

According to an embodiment of the present invention, at least one of the thiophenols having the formula [I] mentioned above is polymerized in the presence of at least one of the Lewis acids as a catalyst and the oxidizing agent, to produce a polyarylene thioether.

According to another embodiment of this invention, at least one of the diphenyldisulfides having the formula [II] mentioned above is polymerized in the presence of at least one of the Lewis acids as a catalyst to produce a polyarylene thioether.

This polymerization may be carried out in the absence of a solvent but preferably in the presence of a solvent.

As the solvent can be used all substances which do not substantially deactivate the catalytic activity of the Lewis acids, but the solvent should desirably be able to dissolve the monomer normally used.

Preferred examples of the solvent are normally nitromethane, dichloromethane, dibromoethane, tetrachloroethane, nitrobenzene and the like. In addition, solvents used in Friedel-Crafts reaction or cationic polymerization can also suitably be used in this invention.

These solvents may be used singly or in a mixture of two or more thereof, or optionally mixed with an inert solvent, for example, an aromatic hydrocarbon such as benzene or toluene.

The proportion of the Lewis acid [A] to the thiophenol or diphenylsulfide [B] used in the polymerization varies depending upon the kinds of the catalyst, solvent and monomer used and the concentration of impurities such as water in the system and hence can hardly be specified, but the proportion, i.e., molar ratio of [A]/[B] is normally in the range of 0.05 to 30, preferably 0.5 to 8.

If the ratio is less than 0.05, then the polymerization rate may be reduced. If the ratio exceeds 30, then it is economically unadvantageous due to the high cost.

When the oxidizing agent [C] is used, the proportion thereof varies greatly depending upon the kind of the oxidizing agent and reaction conditions and hence can hardly be specified, but the proportion, i.e., molar ratio of [C]/[B] is normally in the range of not less than 0.5, preferably about 1 to 10.

The efficiency of reaction can be raised by controlling the amount and concentration of the oxidizing agent to be used, depending upon the kind thereof and polymerization conditions.

The temperature of polymerization varies depending upon the kinds of catalysts and monomers to be used, but it is normally in the range of $-5°$ to $150°$ C., preferably $0°$ to $50°$ C.

The pressure of polymerization is not limitative, and the polymerization can normally be carried out at a normal pressure or autogenetic pressure of the system. Of course, it may be carried out under pressure by using a dilute gas, if necessary, which does not damage the polymerization.

The time of reaction also varies depending upon the kinds of catalysts and monomers to be used, proportions thereof and reaction conditions such as temperature, but it is normally in the range of 1 to 80 hours, preferably 8 to 72 hours.

The order or method of introducing the Lewis acids, thiophenols or diphenyldisulfides, oxidizing agents and solvents into the reaction system, is not limitative, and these compounds may be introduced together into the reaction system or gradually in various orders or methods.

The procedure for reaction is not limitative, and it may be of a continuous type, semicontinuous type or batch type. In the case of the batch type, the agitation of the reaction system is preferred.

As the kind of polymerization there may be a suspension polymerization, block polymerization and etc., and normally a solution polymerization is preferred.

The post-treatments may be carried out in accordance with various known methods.

One example of the post-treatments after the solution polymerization was carried out is:

When the polymerization was completed or proceeded to a necessary extent, the resultant reaction mixture is contacted with water, a lower alcohol such as methanol or a mixture thereof to deactivate the catalyst and the precipitate the resultant polymer. In this case, a short-stop of polymerization, such as a basic material, may be used together, if necessary.

The precipitated polymer is separated from a liquid by a usual separation technique such as filtration and, if necessary, it is neutralized or washed with an aqueous alkali solution. Then, if necessary, it may be further repeatedly subjected to dissolution and reprecipitation with a proper solvent and reprecipitating liquid, separation and washing with a washing liquid such asmethanol, and then it is dried and purified to various purities to recover the polyarylene thioethers.

As the solvent for the dissolution and reprecipitation above can suitably be used, for example, N-methylpyrrolidone, which can effectively dissolve the polymer.

As the reprecipitaing liquid and washing liquid above can normally be used water or methanol, preferably methanol.

On the other hand, unreacted monomers, low-molecular-weight by-products, a solvent and methanol in the mixed liquid separated from the polymer may be purified and recovered by a usual distillation technique and recycled to the reaction system or post-treatment, or utilized in various other applications.

According to a still further embodiment of this invention, at least one selected from the thiophenols having the formula [I] and the diphenyldisulfides having the formula [II] is subjected to the electrolytic polymerization in the presence of at least one compound or composition selected from the Lewis acids and the proton acids, to produce the polyarylene thioether.

This polymerization may be carried out in the absence of a solvent but desirably in the presence of a solvent.

This solvent is as described above.

A material for electrode used in the electrolytic polymerization is not limitative as far as it enables the polymerization to be performed with stability. However, the material is preferably durable against an acid and electrochemically stable. For example, it may be a metal such as platinum, platinum black or gold; graphite; and an electrically conductive organic polymer such as polythienylene, polypyrrole or Nafion, particularly preferably is used a platinum elctrode, or a platinum or platinum black electrode having the above-mentioned electrically conductive organic polymer applied thereon.

The shape and surface area of the electrode are not particularly limited. The shape is optionally selected from a plate, membrane, thin film, filament, rod, cylinder and etc.

The arrangement of electrodes is not particularly limited and may be made by various known ways. In short, at least one pair of electrodes may be arranged so as not to allow them to contact each other.

The electrolyzation may be carried out by a known way such a dipolar type way, tripolar type way or mixed type way.

The type of an electrolytic cell is not particularly limited and known various type cells may be used. Preferably, a cell of a type capable of agitating and flowing an electrolytic reaction liquid and degassing a decomposed gas and provided with a temperature controller.

In accordance with the process of this invention, the electrolytic polymerization is carried out under the following conditions:

The total concentration of monomers, i.e., the thiophenols and the diphenyldisulfides in a solution for electrolytic poymerization is not particularly limitative but it is normally in the range of, for example, $10^{-4}$ to 10 mol/l.

The amounts of the Lewis acids and/or proton acids used vary depending upon the kinds and compositions of the acids, kinds of the monomers and solvents, concentration of impurities such as water in the reaction system and reaction temperature and hence can hardly be specified. However, these amounts should be at least in such a range that electric current is allowed to pass through an electrolytic reaction solution. The molar ratio of (the total of the Lewis acids and the proton acids used)/(the total of the monomers used) is normally in the range of 0.05 to 30, preferably about 0.5 to 8.

If this ratio is less than 0.05, then the polymerization rate will be low or allow side reactions other than the polymerization for decomposition to increase. If the ratio is too high, on the other hand, it is economically unadvantageous. However, this ratio may be beyond the above-mentioned range as far as it has no adverse effect on the object and economy of this invention. For example, when a cheap proton acid, such as sulfuric acid, also used as a solvent, is employed, the amount thereof may be much greater, for example, several hundred times greater than that of the monomer.

The presence of water in the electolytic reaction liquid causes the polymerization rate to increase and the polymerization activity to decrease. Thus, water has various effects on the polymerization. If the water content exceeds some value, the polymerization activity may normally be highly reduced. Therefore, the water content is desirably within tolerance limits. The tolerance limits of the water content vary depending upon the kinds of the acids and solvents used and hence are not limitative, but it is normally not higher than 0.1 mol %.

The voltage and current for the electrolytic polymerization are within the range that the monomers can be oxidized, normally 0.5 to 10 V (reference electrode: Ag/AgCl).

These volatage and current may be either sepcified or changed to various modes such as sweeping.

The reaction temperature, reaction pressure and reaction time for the electrolytic polymerization, the order and method of introducing each of the components into the reaction system, and the reaction type are as described above.

Thus, after passing current, the desired polyarylene thioether can be obtained in the solution, on the electrode or in the electrolytic cell.

The intended polyarylene thioether may be subjected to the post-treatments as already mentioned and recovered in various purities and forms.

According to the process of this invention, a substntially straight-chain, particularly very low cross-linkage polyarylene thioether having the main chain structure represented by the formula [III] of

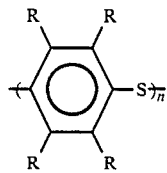

[III]

wherein the four groups R are the same as described for the formula [I] and n is an integer of 2 or more, can be obtained with high selectivity.

The polyarylene thioethers such as polyphenylene thioethers obtained according to the process of this invention have an excellent heat-resistance and chemical-resistance and excellent properties such as a high toughness, strength, impact strength and wear-resistance. Particularly, it is free of salts such as sodium chloride which damages the insulation-resistance as a conventional problem. Therefore, it is very good in electric properties such as insulation-resistance. Furthermore, it is a good engineering plastics, because it is easily workable due to the substantial straight-chain structure of the polymer. Thus, it can suitably be used as fundamental materials, or electrical or mechanical parts in electronic, electrical, chemical or mechanical industries or various fields such as paints and automobiles.

The process of this invention can be carried out with ease and under mild reaction conditions, because the specified raw monomers and the specified catalysts are employed, and it is industrially advantageous due to the use of the cheap raw monomers and catalysts. Furthermore, the process can advantageously provide very low cross-linkage, substantially straight-chain polyarylene thioethers.

This invention will be explained below with reference to some examples.

EXAMPLE 1

2.18 grs of thiophenol was dissolved in 100 ml of nitromethane. To the resultant solution was added 4 grs of iodine. After 1 hour, to the resultant mixture was added 10 grs of aluminum chloride. After the reaction was carried out for 24 hours, the resultant liquid reaction product was dropped into methanol to obtain a precipitate of poly(p-phenylene thioether). The resultant precipitate was washed with an aqueous alkali solution, then dissolved in N-methylpyrrolidone and reprecipitated in methanol to obtain a purified polymer. The gram yield of the purified polymer was 85%. The melting point of this polymer was 160° to 180° C.

The structure of the polymer was determined from the following measurements:

Elemental Analysis (theoretical): 66.1(66.6) % C, 3.79(3.7) % H, 29.4% S.

IR Spectrum: $\nu_{C-H}=3000$, 3050 cm$^{-1}$, $\nu_{C=C}=1380$, 1460, 1560 cm$^{-1}$, $\delta_{C-H}=820$ cm$^{-1}$.

X-ray Diffraction: $\theta=9.5$, 10.5.

$^{13}$C-NMR Spectrum: $\delta$(phenyl C)=135 ppm.

EXAMPLE 2

4.15 grs of 2,6-diethylthiophenol was dissolved in nitrobenzene. To the resultant solution was added antimony pentachloride. The resultant mixture was subjected to the reaction at 0° C. for 3 days. The powdery precipitate of poy(2,6-diethyl-1,4-phenylenethioether) was obtained. This precipitate was purified in the same manner as described in EXAMPLE 1 to obtain 2.9 grs of the purified polymer. The gram yield of this polymer was 70%. The melting point of this polymer was 167° to 182° C. The number-average molecular weight of this polymer determined by the VPO method was 4800.

The structure of the polymer was confirmed by the measurements of IR spectrum, elemental analysis and $^1$H-NMR.

IR Spectrum: $\nu_{C-H}=2890$, 2945, 2980 cm$^{-1}$, $\nu_{C-C}=1380$, 1465 cm$^{-1}$, $\delta_{C-H}=890$ cm$^{-1}$.

$^1$H-NMR Spectrum: $\delta$(—CH$_3$ 1H)=1.25 ppm, $\delta$(—CH$_2$—4H)=2.70 ppm, $\delta$(phenyl 2H)=7.00 ppm.

Elemental Analysis(theoretical): 71.5(73.2) % C, 7.91(7.3) %, H, 19.44(19.5) % S.

EXAMPLE 3

12.4 grs of 2-methyl-thiophenol was dissolved in 25 ml of dichloromethane. To the resultant solution was added 30 ml of TiCl$_4$ and 15 ml of thionyl chloride. The reaction was carried out at 20° C. for 1 day in the presence of oxygen. The resultant precipitate was purified in the same manner as described in EXAMPLE 1. 6.49 grs pf the purified powdery poly(2-methylphenylene thioether) was obtained. The structure of the polymer was confirmed by the following measurements:

IR Spectrum: $\nu_{C-H}=2845$, 2910, 2950 cm$^{-1}$, $\nu_{C-C}=1375$, 1440, 1550 cm$^{-1}$, $\delta_{C-H}=870$ cm$^{-1}$.

$^1$H-NMR Spectrum: $\delta$(—CH$_3$ 3H)=2.35 ppm, $\delta$(phenyl 3H)=7.15 ppm.

Elemental Analysis(theoretical): 67.7(68.9) % C, 4.98(4.92) %, H, 25.9(26.2) % S.

EXAMPLE 4

2.18 grs of diphenyl disulfide was dissolved in 100 ml of nitromethane. The resultant solution was mixed with 10 grs of aluminum chloride and agitated at room temperature for about 1 day. The resultant liquid reaction product was dropped into methanol to obtain a light yellow precipitate. This precipitate was filtered, washed with an aqueous alkali solution, boiled in water and dissolved in N-methylpyrrolidone. The reprecipitation was conduced in methanol to obtain 1.51 gr of a white powdery polymer. The properties of the polymer were measured to obtain the following results:

Elemental Analysis(theoretical): 66.5(66.6) % C, 3.7(3.7) % H, 29.8(29.6) % S.

IR Spectrum: $\nu_{C-H}=3000$, 3050 cm$^{-1}$, $\nu_{C=C}=1380$, 1460, 1560 cm$^{-1}$, $\delta_{C-H}=820$ cm$^{-1}$.

$^{13}$C-NMR Spectrum: $\delta$(phenyl C)=135 ppm.

X-ray Diffraction: $\theta=9.5$, 10.5°.

Melting Point: 175°-180° C.

From these results the polymer was confirmed to be polyphenylene thioether.

EXAMPLE 5

4.15 grs of 2,2',6,6'-tetraetju;docjemu; dosi;fode was dissolved in 50 ml of nitrobenzene. The resultant solution was mixed with 5 ml of antimony pentachloride and agitated at 10° C. for 3 hours. The purification was conducted in the same manner as described in EXAMPLE 4 to obtain 3.5 grs of a white powdery polymer. The properties of the polymer were measured:

Elemental Analysis(theoretical): 72.8(73.2) % C, 7.6(7.3) % H, 19.4(19.5) % S.

IR Spectrum: $\nu_{C-H}=2890$, 2945, 2980 cm$^{-1}$, $\nu_{C=C}=1380$, 1465 cm$^{-1}$, $\delta_{C-H}=890$ cm$^{-1}$.

$^1$H-NMR Spectrum: $\delta$(—CH$_3$)=1.25 ppm, $\delta$(—CH$_2$—),=2.70 ppm, $\delta$(phenyl)=7.00 ppm.

$^{13}$C-NMR Spectrum: δ(—CH$_3$ C) 16 ppm, δ(—CH$_2$—C) 24 ppm, δ(phenyl) 130 ppm.
Melting Point: 167°–178° C.
Molecular Weight: 4300.

From these results the polymer was confirmed to be poly(2,6-diethylphenylene thioether having the structure of poly(2,6-diethylphenylenesulfide). The structure of poly(2,6-diethylphenylenesulfide) was confirmed by the above-mentioned IR and NMR spectra.

EXAMPLE 6

1.82 gr of 2,2',3,3',5,5',6,6'-octafluorodiphenyldisulfide was dissovled in a mix solvent of 100 ml of dichloromethane and 10 ml of nitromethane. The resultant solution was mixed with 20 grs of tungsten hexachloride and agitated at −20° C. for 2 days. The purification was carried out in the same manner as described in EXAMPLE 4 to obtain 0.3 gr of a polymer. The melting point of this polymer was 205° to 300° C.

From the data as shown below the polymer was confirmed to have a structure of poly(2,3,5,6-tetrafluorophenylenesulfide).

Elemental Analysis(theoretical): 37.1(40.0) % C, 40.3(42.2) %, F, 16.5(17.8) % S.
IR Spectrum: $\nu_{C=C}$=1390, 1470 cm$^{-1}$.

EXAMPLE 7

12.4 grs of 2,2'-dimethyldipheny disulfide was dissolved in a mix solvent of 25 ml of 1,1,2,2-tetrachloroethane and 25 ml of 1,2,3-trichloro benzene. The resultant solution was mized with 10 grs of aluminum chloride and 30 ml of titanium tetrachloride and subjected to the reaction for half a day. The purification was carried out in the same manner as described in EXAMPLE 4 to obtain 3.82 grs of a yellow-brown powdery polymer. The melting point of this polymer was 130° to 160° C.

From the data as shown below the polymer was confirmed to have a structure of poly(2-methylphenylenesulfide).

Elemental Analysis(theoretical): 67.7(68.9) % C, 4.98(4.92) % H, 25.9(26.2) % S.
IR Spectrum: $\nu_{C-H}$=2845, 2910, 2950 cm$^{-1}$, $\nu_{C=C}$=1375, 1440, 1550 cm$^{-1}$, $\delta_{C-H}$=870 cm$^{-1}$,
$^1$H-NMR Spectrum: δ(3H CH$_2$)=2.35 ppm, δ(3H phenyl)=7.15 ppm.

EXAMPLE 8

1.07 gr of thiophenol and 10 grs of aluminum chloride were dissolved in 100 ml of nitromethane. The resultant solution was placed in an electrolytic cell. The electrolyzation was carried out at 1.5 V with platinum plate electrodes (2×5 cm). After 5 F/mol of current was passed, 0.81 gr of a polymer was obtained in the cell.

The elemental analysis, IR spectrum and melting point of this polymer were determined as follows:
Elemental Analysis(theoretical): 66.1(66.6) % C, 3.7(3.7) % H, 29.6(29.6) % S.
IR Spectrum: $\nu_{C-H}$=3000, 3050 cm$^{-1}$, $\nu_{C=C}$=1380, 1460, 1560 cm$^{-1}$, $\delta_{C-H}$=820 cm$^{-1}$.
Melting Point: 187°–235° C.

From these measurements the polymer was confirmed to be poly(p-phenylenesulfide).

EXAMPLE 9

1.04 gr of 2,6-diethylthiophenol and 10 ml of trifluoroacetic acid were dissolved in 100 ml of nitromethane. The resultant solution was placed in an electrolytic cell and subjected to the constant-current electrolyzation at a current density of 1 mA/cm$^2$ with two sets of graphite electrodes (2×5 cm). After 0.24 F/mol of current was passed, the solution was subjected to the precipitation in methanol to obtain 0.81 gr of a white polymer.

The elemental analysis, IR spectrum, $^1$H-NMR spectrum, number-average molecular weight and melting point of the polymer were determined as follows:
Elemental Analysis(theoretical): 72.5(73.2) % C, 7.91(7.91) %, H, 19.4(19.5) % S.
IR Spectrum: $\nu_{C-H}$=2890, 2980 cm$^{-1}$, $\nu_{C=C}$=1380, 1460 cm$^{-1}$, $\delta_{C-H}$=890 cm$^{-1}$.
$^1$H-NMR Spectrum: δ(CH$_3$)=1.25 ppm, δ(—CH$_2$—)=2.70 ppm, δ(phenyl)=7.00 ppm.
Number-Average Molecular Weight: 4300.
Melting Point: 187°–235° C.

From the data above the polymer was confirmed to be poly(2,6-diethyl-1,4-phenylenesulfide).

EXAMPLE 10

6.2 grs of 2-methylthiophenol, 25 ml of dichloromethane and 25 ml of tin tetrachloride were dissolved in 25 ml of nitrobenzene. The resultant solution was placed in an electrolytic cell and subjected to the electrolyzation at 1.9 V with platinum electrodes (5×5 cm). After 2 F/mol of current was passed, the solution was subjected to the reprecipitation in methanol to obtain 4.1 grs of a polymer.

The data of this polymer were as follows:
Elemental Analysis(theoretical): 68.7(68.9) % C, 4.98(4.92) %, H, 25.9(26.2) % S.
IR Spectrum: $\nu_{C-H}$=2845, 2710, 2750 cm$^{-1}$, $\nu_{C=C}$=1375, 1440, 1550 cm$^{-1}$, $\delta_{C-H}$=870 cm$^{-1}$,
$^1$H-NMR Spectrum: δ(CH$_3$)=2.35 ppm, δ(phenyl)=7.15 ppm.
Melting Point: 158°–182° C.

From the data above the polymer was confirmed to be poly(2-methylphenylenesulfide).

EXAMPLE 11

2.18 grs of diphenyl disulfide and 5 ml of sulfuric acid were dissolved in 95 ml of nitromethane. The resultant solution was placed in an electolytic cell and subjected to the electrolyzation at 1.8 V with platinum plate electrodes (2×5 cm). After 5 F/mol of current was passed, 0.48 gr of a polymer was obtained in the cell.

The data of this polymer were as follows:
Elemental Analysis(theoretical): 66.1(66.6) % C, 3.79(3.7) %, H, 28.7(29.6) % S.
IR Spectrum: $\nu_{C-H}$=3000, 3050 cm$^{-1}$, $\nu_{C=C}$=1380, 1460, 1560 cm$^{-1}$, $\delta_{C-H}$=820 cm$^{-1}$.
Melting Point: 187°–235° C.

From these data the polymer was confirmed to be poly(p-phenylenesulfide).

EXAMPLE 12

1.04 gr of 2,2',6,6'-tetraethyldiphenyl disulfide and 10 ml of methan sulfuric acid were dissolved in 90 ml of nitromethane. The resultant solution was placed in an electrolytic cell and subjected to the constant-current electrolyzation at 2 mA/cm$^2$ with two sets of graphite electrodes (2×2 cm). After 0.5 F/mol of current was passed, the solution was subjected to the reprecipitation in methanol to obtain 0.82 gr of a white polymer.

The data of this polymer were as follows:
Elemental Analysis(theoretical): 72.5(73.2) % C, 7.91(7.3) %, H, 19.4(19.5) % S.
IR Spectrum: $\nu_{C-H}$=2890, 2945, 2980 cm$^{-1}$, $\nu_{C=C}$=1380, 1460 cm$^{-1}$, $\delta_{C-H}$=890 cm$^{-1}$.

$^1$H-NMR Spectrum: $\delta(CH_3) = 1.25$ ppm $\delta(-CH_2-) = 2.70$ ppm $\delta(phenyl) = 7.00$ ppm Number-Average Molecular Weight: 4300.

Melting Point: 178°–173° C.

From these data the polymer was confirmed to be poly(2,6-diethyl-1,4-phenylenesulfide).

EXAMPLE 13

3.1 grs of 2,2'-dimethyldiphenyl disulfide and 25 ml of dichloromethane were dissolved in 25 ml of trifluoromethylsulfuric acid. The resultant solution was subjected to the electrolyzation with platinum electrodes (1×1 cm) while repeatedly sweeping a voltage from 0 V to 3 V at 100 mV/sec. After 10 hours, the solution was poured into methanol to obtain 2.3 grs of a precipitated polymer.

Elemental Analysis(theoretical): 68.7(68.9) % C, 4.98(4.92) %, H, 25.9(26.2) % S.

IR Spectrum: $\nu_{C-H} = 2845$, 2910, 2950 cm$^{-1}$, $\nu_{C=C} = 1375$, 1440, 1550 cm$^{-1}$, $\delta_{C-H} = 870$ cm$^{-1}$.

$^1$H-NMR Spectrum: $\delta(CH_3) = 2.35$ ppm, $\delta(phenyl\ 3H) = 7.15$ ppm.

Melting Point: 158°–182° C.

From these data the polymer was confirmed to be poly(2-methylphenylenesulfide).

What is claimed is:

1. A process for preparing a polyarylene thioether which comprises electrolytically polymerizing a diphenyldisulfide represented by the following formula

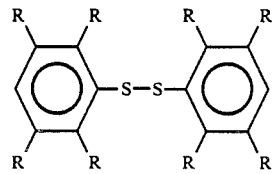

wherein each R group may be the same or different and is a substituent selected from the group consisting of a hydrogen atom, a lower alkyl group, a halogen atom and a lower alkoxy group, in the presence of an acid selected from the group consisting of a Lewis acid and a proton acid.

2. The process according to claim 1, wherein R in said formulae is hydrogen atom, a lower alkyl group or halogen atom.

3. The process according to claim 2, wherein said Lewis acid is at least one selected from the group consisting of aluminum chloride, titanium tetrachloride, antimony pentachloride and tungsten hexachloride.

4. The process according to claim 2, wherein said proton acid is sulfuric acid, trifluoroacetic acid or trifluoromethylsulfuric acid.

* * * * *